United States Patent [19]

Spangle

[11] Patent Number: 4,466,833

[45] Date of Patent: Aug. 21, 1984

[54] LIGHTWEIGHT CEMENT SLURRY AND METHOD OF USE

[75] Inventor: Lloyd B. Spangle, Claremore, Okla.

[73] Assignee: The Dow Chemical Company, Midland, Mich.

[21] Appl. No.: 394,597

[22] Filed: Jul. 2, 1982

Related U.S. Application Data

[63] Continuation-in-part of Ser. No. 373,472, Apr. 30, 1982, abandoned.

[51] Int. Cl.$^3$ .................. C04B 7/35; E21B 33/13
[52] U.S. Cl. ........................ 106/88; 106/90; 166/293
[58] Field of Search ............... 106/86–88, 106/90; 166/293

[56] References Cited

U.S. PATENT DOCUMENTS

| | | | |
|---|---|---|---|
| 2,913,346 | 11/1959 | Hoffman | 106/88 |
| 3,926,257 | 12/1975 | Marrast et al. | 106/90 |
| 3,979,217 | 9/1976 | Sutton | 106/88 |
| 4,300,633 | 11/1981 | Stewart | 166/250 |
| 4,340,427 | 7/1982 | Sutton | 106/88 |

OTHER PUBLICATIONS

ASME Paper No. 75, PET-10, (1975).
Detkov et al., The Use of Aerated Cement Slurries for Well Cementing, Neft. Khoz., No. 5, 16-20, (1976).
Shakmaev et al., Isolation of Lost Circulation Zones Using Aerated Cement Slurries Burenie, No. 8, 19-21, (1979).

*Primary Examiner*—James Poer
*Attorney, Agent, or Firm*—David H. Fifield

[57] ABSTRACT

A foamed, cement slurry comprising an aqueous hydraulic cement slurry containing gas as discrete entrained bubbles and a specific quaternary ammonium compound as a foaming agent; and a process of plugging a subterranean void by emplacing the foamed slurry in the subterranean void and then permitting the foamed slurry to therein harden.

30 Claims, No Drawings

LIGHTWEIGHT CEMENT SLURRY AND METHOD OF USE

Cross-Reference to Related Application

This is a continuation-in-part of application Ser. No. 373,472, filed Apr. 30, 1982 now abandoned.

Background of the Invention

The invention is a lightweight aqueous foamed cement slurry and a method of using same to fill a subterranean void. The slurry is particularly useful in the art of oil and gas well cementing.

Cement slurries have been foamed as a method of lightening such slurries for use in oil and gas wells or for subterranean grouting; U.K. Pat. No. 819,229; ASME Paper No. 75 PET-10 (1975). U.S. Pat. No. 3,926,257 suggests adding a foaming agent to a cement slurry which foaming agent later collaborates with gas escaping from a gas-containing formation to form a foam barrier to prevent subsequent migration of gas during the setting of the cement. It is stated that the foaming agent may be a nonionic, anionic, or cationic. The cationic surfactant is broadly stated to be "a quaternary ammonium salt". The only embodiment specifically mentioned is a mixture of an oxyethylene aliphatic compound and at least one sulfate of a polyethoxy fatty alcohol. In U.S. Pat. No. 4,300,633 it is stated that the foaming agents to be used must be active in a highly alkaline environment and show resistance to multivalent organic cations if sea water is used. Anionic surfactants, specifically organic alkali metal sulfates or sulfonates are said to be particularly suitable for this purpose.

Summary of the Invention

I have discovered that a foamed hydraulic cement slurry comprising an aqueous slurry of hydraulic cement, entrained gas bubbles and a foaming agent selected from certain specific quaternary ammonium compounds, is superior to foamed cement slurries prepared from other quaternary ammonium compounds and from other nonionic and anionic surfactants. When prepared with the specified foaming agents, a stable, uniform foam of relatively small bubble size is rapidly formed in which there is relatively little segregation of the liquid, solid and gaseous components. Hardened cement prepared from such slurries in many cases exhibits superior strength and low permeability when compared with hardened foamed cements prepared utilizing other foaming agents. My invention further comprises a process of cementing subterranean voids by emplacement of this slurry to give a strong, impermeable seal in applications such as the grouting of underground bore holes and plugging the voids created or encountered during the drilling of oil, gas or geothermal wells. Because of the light weight of the slurry, the breakdown of weak formations during cementing of such subterranean voids is avoided.

Foamed slurries of the invention exhibit an additional advantage of maintaining their foamed nature at temperatures in excess of about 150°, and even in excess of about 200° F. At such temperatures, foamed cement slurries prepared with other than the foaming agent of this invention may begin to collapse before the slurry has hardened.

The foaming agent utilized in the instant invention which permits attainment of these desirable benefits is a composition represented by the formula $$R(R'-)_3 N^+ X^-  \quad (I)$$

wherein X is chloride, bromide, iodide or hydroxyl, R is a aliphatic hydrocarbyl radical comprising from 8 to 16 carbon atoms and R' is, independently each occurrence, an alkyl radical of one to three carbon atoms, or hydroxyethyl, and the sum of the carbon atoms in R and all R' is not greater than about 20.

Detailed Description of the Invention

The invention comprises a foamed hydraulic cement slurry comprising a gas-containing aqueous slurry hydraulic cement and a foaming agent represented by Formula I. The invention further comprises a method of plugging a subterranean void by emplacing the foamed cement slurry of the invention in the subterranean void and allowing the slurry to harden. The foamed slurry is preferably emplaced in the borehole drilled for an oil or gas well or in the annulus created between the borehole and the casing of such a well. Except for the equipment adapted for the generation of the foam, as described more fully hereafter, standard oilfield equipment and emplacement methods may be utilized to carry out the process of the invention.

The necessary elements of the foamed cement slurry of the invention are an aqueous slurry of hydraulic cement, prepared by adding water to a hydraulic cement component, which preferably comprises Portland cement, a gas which is entrained as discrete bubbles in said aqueous cement slurry and a foaming agent represented by Formula I. The aqueous cement slurry, as described more fully below is commonly mixed in the usual fashion and thereafter the foaming agent and gas are added to the slurry in an enclosed conduit.

Foaming Agent

The most important element of the foamed slurry of the invention is the foaming agent which is a quaternary ammonium compound represented by Formula I, above. In Formula I, R represents a hydrocarbyl group comprising 8 to 16 carbon atoms and preferably 10 to 14 carbon atoms. R may be saturated or unsaturated and is suitably selected from fatty alkyl groups of 8 to 16 carbon atoms. Preferably, R is a straight chain hydrocarbyl radical. More preferably, R represents a mixture of hydrocarbyl radicals derived from a vegetable oil such as cocoa oil. In the so called "coco" alkyl groups, the carbon chain length may range from 8 to 16 carbon atoms with chains of 10, 12 and 14 carbon atoms predominating. Accordingly, R may represent a mixture of such hydrocarbyl groups ranging from 8 to 16 carbon atoms or may be selected strictly from hydrocarbyl groups of one uniform chain length, i.e. the dodecyl group.

R' represents the other three hydrocarbyl radicals associated with the quaternary nitrogen atom. Suitably, R' is a one to three carbon alkyl radical or a hydroxyethyl radical, independently in each occurrence. Preferably, it is an ethyl or methyl group, or is a hydroxyethyl group in up to two occurrences. More preferably, R' is hydroxyethyl in up two occurrences or is methyl. The sum of all the carbon atoms in the R and R' groups associated with one quaternary nitrogen atom is suitably at least 12, preferably at least 13, and more preferably at least 14 carbon atoms and the sum is 20 or less, preferably 19 or less and more preferably 18 or less total carbon atoms.

In Formula I, X represents a chloride, bromide, iodide or hydroxyl radical; preferably it represents a chloride or hydroxyl radical and more preferably a chloride radical. Quaternary ammonium compounds of Formula I are widely known or may readily be prepared by known methods, for example by the reaction of an alkyl halide of the Formula RX with a tertiary amine of the formula (R'—)$_3$ N under known conditions. In some instances, where the foaming agent of Formula I exhibits limited solubility in water, a cosolvent such as isopropanol may be added to I to permit full solubilization in the aqueous portion of the hydraulic cement slurry. Furthermore, I have noted that the addition of other nonionic surfactants in conjunction with the foaming agent of Formula I may serve to enhance the stability of the foam in the aqueous cement slurry. Materials which are known foam stabilizers, such as low molecular weight polypropylene glycols of about to 200 to 600 molecular weight, may suitably be used in addition to the agent of Formula I. Certain fatty amine oxides also serve in this fashion. For example, bis(2-hydroxyethyl) cocoamine oxide combined with the foaming agent of I serves to form a uniform, stable foam in the aqueous hydraulic cement slurry. Likewise, ethoxylated derivatives of the quaternary compound of Formula I formed by the addition of several moles of ethylene oxide to a compound of Forumla I where R' is hydroxyethyl in one or two occurrences, is a suitable adjunct to be used in combination with the compound of Formula I. For example, a compound prepared by the addition of about 15 moles of ethylene oxide to cocoamine and subsequent reaction with methyl chloride serves to enhance the foam stability of aqueous cement slurries containing the foaming agent of Formula I.

The quantity of the foaming agent I to be added to the aqueous hydraulic cement is sufficient to permit the major portion of the gas to remain entrained as discrete bubbles in the slurry until the slurry has hardened sufficiently so that coalescence or migration of bubbles is no longer possible. This quantity will vary according to the other components and properties of this slurry and may be determined for a slurry by first measuring the API Standard RP10B "thickening time" of the slurry and then empirically determining the quantity of foaming agent needed to maintain the desired stable foamed slurry for that time under the conditions of temperature and pressure which will be encountered by the cement slurry after it is emplaced. To be certain that the stability of the foamed slurry is maintained, it is preferable to add excess foaming agent rather than too little. Commonly, by volume, at least about 0.1 part foaming agent per 100 parts of water, preferably at least about 0.3 part and more preferably at least about 0.5 part foaming agent will be adequate. Normally, about 3 parts, more preferably no more than about 2 parts and more preferably no more than about 1.5 part foaming agent per 100 parts water will be adequate to serve the intended purpose. However, as noted above, excess may be added without adversely affecting the resulting foamed slurry. The method for addition of foaming agent is described in more detail below.

Solid Portion

As is readily apparent, the foamed cement slurry will comprise solids, liquids (primarily water), and the entrained gas. The solid components of the cement slurry will primarily comprise the hydraulic cement component. Preferably this comprises a Portland cement and more preferably is selected from the categories of cements, most preferably Class A, C or G, set forth in standards of the American Petroleum Institute (API) for use in oil and gas well cementing. In addition to Portland cements, cements known as high alumina cements are also useful for this purpose.

Powdered anhydrous sodium silicate is another solid component which may be added to the aqueous cement slurry preferably in an amount of about 0.5 part to about 3 parts, by weight, per 100 parts of the hydraulic cement component. Other solid additives commonly incorporated in oil well cement slurries may likewise be added so long as they do not adversely affect the quality and stability of the foam. Such additives include fluid loss control agents, retarders, accelerators, extenders or fillers such as fly ash or pozzolans, finely divided silica as silica flour, sodium chloride, calcium chloride or sulfate, and the like. Thickeners such as bentonite and attapulgite, HEC, etc. are generally not employed in the invention slurries. Similarly, since a lighweight slurry is desired, hematite, barite or other such weighting agents are generally not added. Also, dispersing agents generally tend to degrade or destabilize the foam or cause separation of the liquid in solid phases, and for this reason will ordinarily not be employed.

Overall, the solids included in the foamed hydraulic cement slurry comprise, by volume, typically about 10 preferably at least about 15 up to about 35, preferably up to about 30 percent of the total foamed slurry.

Liquid Portion

The second major portion of the foamed cement slurry is the portion made up of liquid components. Naturally, the major portion of such liquids is water but may further comprise liquid versions of the additives previously mentioned above such as fluid loss control agents, retarders, accelerators and sodium silicate solutions. The water may be relatively fresh water or may be an aqueous brine containing calcium chloride or sodium chloride, commonly produced from underground formation in oil and gas production or seawater. Preferably, the water to be employed is relatively fresh and lacking in dissolved mineral components. Typically, the liquid components will make up about 25, preferably at least about 30 percent up to about 60, preferably up to about 55 percent of the total volume of the foamed slurry.

Gaseous Portion

The gaseous portion of the foamed cement slurry is preferably added as a gas or mixture of gases to the preformed aqueous hydraulic cement slurry which already contains the foaming agent. Alternatively, the gas may be generated in situ by the chemical reaction of an active metal such as aluminum or magnesium with the strongly basic cement slurry to generate hydrogen gas. However, because of the explosive nature of hydrogen, such agents are more suitably replaced by synthetic gas blowing agents such as are employed in the plastic foam generating arts. Suitably, organic nitrogen containing compounds which generate gaseous nitrogen when decomposed are preferred as in situ gas-generating agents. However, because of the general availability of compressed air, nitrogen and carbon dioxide in the oilfield, the addition of one or more of these gases to an aqueous hydraulic slurry containing the foaming agent is the method of choice in generating the foamed cement slurry of the invention. More preferably, nitrogen and/or air are so employed because of their lower solubility in aqueous solutions than carbon dioxide.

Gas suitably comprises, by volume, about 20 percent, preferably at least about 25 percent up to about 55 percent, preferably up to about 50 percent of the foamed slurry. When referred to herein, the volume of gas or of foamed slurry means that volume of gas or foam under the conditions at which the slurry will be used, e.g. pressure and temperature encountered in a subterranean void at which the foamed slurry is emplaced. This generally can be determined with sufficient accuracy from the ideal gas equation, i.e.

$$V_2 = \frac{P_1 V_1 T_2}{P_2 T_1}.$$

It is commonly available from tables used by those who pump nitrogen or carbon dioxide in oil and gasfield operations. $V_2$ represents the volume of the gas under downhole temperature and pressure conditions, $T_2$ and $P_2$, and $P_1 V_1 T_1$ represent the pressure, volume and temperature of the gas in the foamed slurry upon preparation at the surface.

An "average diameter" of bubbles entrained in the hardened foamed slurry may be roughly approximated by cutting a statistically significant number of vertical cross-sections through the hardened slurry, measuring the visible bubbles' diameters, averaging the sum of these measured diameters and then doubling that number. A more accurate calculation of the average diameter may be obtained by multiplying the average of the measured diameters by $4/\pi$; i.e., by 1.27. The average diameter of the major portion of the entrained gas bubbles is preferably less than about one mm, more preferably less than about 0.5 mm and most preferably less than about 0.3 mm. When employing the preferred foaming agents of the invention, the foam produced by strongly shearing the gas-containing hydraulic cement slurry will be a highly uniform foam with bubbles of a described average diameter and with only small amounts of bubbles having a diameter greater than one millimeter.

Mixing and Emplacement

The foamed slurries of the invention are suitably prepared by first mixing the base aqueous hydraulic cement slurry with any standard cement blending equipment, such as a paddle mixing tank or a venturi-type cement slurry mixer. The means for preparing the slurry is not a critical element of the instant invention.

Once the slurry is prepared, it is suitably moved by a transfer means into an enclosed conduit suitable for transporting fluids. Oilfield treating pipe can easily serve as such a conduit. The slurry transfer means can be a common hydraulic pump such as a triple cylinder positive displacement pump commonly known as a "triplex" pump. This pump is widely used in the oilfield. The transfer means is not critical as long as it has the ability to transport a liquid/solid slurry with suitable velocity and a centrifugal pump may likewise be employed for this purpose. To the slurry in the conduit is added the foaming agent which may be injected into the slurry-carrying conduit by means of a small liquid blending pump connected to the conduit by a "tee" connection or a "Y-bend" connection in a suitable fashion. It is not advisable to add the foaming agent to the slurry upstream from the slurry transfer means, e.g. in the mixing apparatus, since addition at that point may cause air to be entrained in the slurry making it difficult to accurately measure the amount fo gas entrained and difficult for all but especially designed pumps to handle such a foamed mixture. Such problems in handling may be avoided by adding the foaming agent directly at the suction of a pump utilized as a transfer means or immediately downstream from the transfer means to the conduit containing the aqueous slurry and foaming agent. The gas is then suitably added at a given rate to obtain the desired gas:liquid:solids proportions for the intended application. Ordinarily, for oilfield applications, sufficient gas is added to obtain a resulting foamed slurry of the density of about 5 to about 13 pounds per gallon. Pumping rates of either the slurry or of the gas may be adjusted so that the desired ratio is obtained.

The foamed slurry will be generated at the point of injection of the gas and injection may be accomplished by a "tee" connection to generate suitable turbulence at the point of mixing of the gas and the aqueous slurry. However, it is preferable to further shear the gas-containing slurry to obtain a smooth, uniform, small bubble size foam by dividing the conduit into two separate streams and then rejoining the thus divided streams in a mixing chamber by impacting the streams against one another at a common in-line focal point. This may be accomplished by forcing the two streams through orifices in a generally opposed fashion. Such a dividing of the slurry stream may be accomplished by a tee in the conduit, piping from the tee through two separate conduits which are then reconnnected at another tee to cause the two opposing streams to mix at the junction of the tee. The resulting foamed slurry is then taken off as a single combined stream again. This combined stream then is conducted through the well bore tubing or the annulus into the subterranean void in the fashion well known in the oilfield for cementing subterranean voids and boreholes. After being permitted to harden in the subterranean void, the hardened foamed cement slurry often has low permeability and high strength relative to other equivalent density cements prepared from slurries other than that of the instant invention. While this is the preferred method of preparing the foamed slurry, other high shear mixing devices may be used for this purpose.

Specific Embodiments

Example 1. By way of example, the following embodiments of foamed slurries of the invention are prepared. The cement component is an API Class H cement having a surface area of about 2500 cm$^2$/g (by SediGraph 5000). The "extender" in half of the embodiments is a fly ash (LaDue) having a surface area (also by SediGraph) of about 3500 cm$^2$/g. Anhydrous sodium metasilicate is present in each slurry at a level of about one percent, based on weight of the cement component ("BWOC"). Foaming agent of Formula (I) is present at about 0.5–3 percent, based on volume of water. Gas is entrained in the foaming agent-containing slurry prepared from the dry components and water. Resultant foamed slurry densities are described in the following Table I.

TABLE I

| Slurry | Percent By Volume of Slurry Gas | Percent By Volume of Slurry Water | Percent By Volume of Slurry Solids | Percent Extender BWOC | Density of Foamed Slurry in Pounds/Gallon |
|---|---|---|---|---|---|
| A | 56 | 24.6 | 19.4 | — | 7.1 |
| AA | 56 | 24.6 | 19.4 | 50 | 6.4 |
| B | 56 | 32.5 | 11.5 | — | 5.7 |
| BB | 56 | 32.5 | 11.5 | 50 | 5.3 |
| C | 50 | 28 | 22 | — | 8.1 |
| CC | 50 | 28 | 22 | 50 | 7.2 |
| D | 50 | 37 | 13 | — | 6.5 |
| DD | 50 | 37 | 13 | 50 | 6.0 |
| E | 40 | 33.6 | 26.4 | — | 9.7 |
| EE | 40 | 33.6 | 26.4 | 50 | 8.7 |
| F | 40 | 44.4 | 15.6 | — | 7.8 |
| FF | 40 | 44.4 | 15.6 | 50 | 7.2 |
| G | 30 | 39.2 | 30.8 | — | 11.3 |
| GG | 30 | 39.2 | 30.8 | 50 | 10.2 |
| H | 30 | 51.8 | 18.2 | — | 9.1 |
| HH | 30 | 51.8 | 18.2 | 50 | 8.4 |
| I | 20 | 44.8 | 35.2 | — | 13.0 |
| II | 20 | 44.8 | 35.2 | 50 | 11.6 |
| J | 20 | 59.2 | 20.8 | — | 10.4 |
| JJ | 20 | 59.2 | 20.8 | 50 | 9.6 |

Example 2

Utilizing the basic slurry of Example 1AA, various surfactants are substituted as the foaming agent. The base slurry is mixed in a Waring blender at high speed, with a special screw-on lid for the blender, the lid having a small ¼ inch hole in its center. After the solids/water blend is mixed for about 30 seconds to form a homogeneous slurry, about 1–2 percent, based on volume of water, ("BVOW") of a solution of foaming agent is injected through the hole in the lid. The most preferred foaming agents of the invention generate an immediate foam which fills the blender chamber in about 2–5 seconds with a small bubble, uniform foam, having an average bubble diameter of about 0.5 mm or less. The foam when permitted to stand for 15–20 minutes remains uniform and stable without appreciable collapse or defoaming. When allowed to cure, the resultant hardened foamed cement often has permeability of about 0.1 millidarcy or less.

When less preferred foaming agents of the invention are substituted, from 5–20 seconds may be required to fill the chamber after introduction of the foaming agent. The resultant foam has relatively uniform, small bubbles of an average diameter of about 1 mm or less. There may be a small number of noticeably larger bubbles. The foam is fairly stable without significant collapse in 15–20 minutes. When allowed to harden, the resultant foamed cement often has a permeability on the order of about 0.2 to 1 millidarcy and a cross-section of the hardened foamed cement will show only minor gravity segregation of solids and gas bubbles.

When other surfactants outside the limits of Formula I are employed as the foaming agent, the chamber may not fully fill even after 1–2 minutes of shearing, may require significantly more than 3 percent (BVOW) foaming agent to fully fill the chamber with foam, if at all, and may exhibit substantial foam collapse after standing 15–20 minutes. The foam may contain a significant portion of bubbles having average diameter greater than one mm and the hardened resultant cement, if remaining foamed at all, may exhibit severe segregation and stratification of bubbles and solids resulting in highly permeable portions in the upper part and dense, impermeable portions in the lower part.

Example 3

A cement slurry is prepared from a 35:65 (weight) pozzolan:Class G cement blend with sufficient water to make about a 14 pound per gallon ("ppg") slurry. About 370 barrels of the 14 ppg slurry (aout 15,550 gallons) is prepared with the addition of about 1 percent of anhydrous sodium metasilicate, about 18 percent sodium chloride and about 0.7 percent of a calcium lignosulfonate retarder (all BWOC). To the slurry so prepared is added about 1.5 percent (BVOW) of a foaming agent comprising (by volume) about 3 parts trimethylcocoammonium chloride and about 1 part bis(2-hydroxyethyl) cocoamine oxide, in about an equal volume of isopropanol. To this 370 barrels of slurry containing the foaming agent is added about 125,000 standard cubic feet of nitrogen by injecting through a "tee" to the line containing the slurry. The line is thereafter split into 2 lines at the "tee" and the 2 lines are later recombined at another "tee" through a choke device in each of the lines causing the 2 slurry streams to impact with considerable turbulence and good mixing, as described earlier. The rate of nitrogen addition to the slurry is varied, in a staged fashion, throughout with more being added to slurry intended for the bottom of the hole and less to slurry added to the top. In this fashion, a slurry of relatively uniform density of about 10.5 ppg from top to bottom of the hole is obtained. The cement slurries are used to cement a five and one-half inch casing to a depth of about 8300 feet in a previously drilled borehole. About 50 barrels (about 2100 gallons) of a gelled spacer fluid is first pumped into the casing followed by about 30 barrels (about 1250 gallons) of an aqueous surfactant wash solution. Then about 24 barrels (about 1000 gallons) of the 14 ppg base slurry follows after which the remaining 370 barrels of 14 ppg slurry to which the nitrogen has been added are pumped, followed by about 90 barrels (about 3800 gallons) of a 36:65 pozzolan:Class G tail-in slurry made up to about 15 ppg. About 190 barrels (about 8000 gallons) of salt water is then pumped until returns of the spacer fluid and chemical wash are seen. The well bore is then shut in and the cement slurries are permitted to set. In this manner, a "long-string" casing job is completed in one single pumping operation without having to "stage" the different cement slurries over the desired intervals of the borehole.

Instead of varying the gas addition, the gas may be metered into the slurry at about a constant rate. The resulting slurry will be of greater density near the bottom of the wellbore when in place and of lesser density near the top. The density of the foamed slurry being pumped into the wellbore can be monitored by an instrument commonly used in oilfield service called a densiometer.

I claim:

1. A foamed hydraulic cement slurry comprising an aqueous slurry of hydraulic cement, an entrained gas in the form of multiple, discrete bubbles and a foaming agent represented by the formula $$R(R'-)_3 N^+ X^-$$

wherein X is chloride, bromide, iodide or hydroxyl, R is an aliphatic, hydrocarbyl radical comprising from 8 to 16 carbon atoms and R' is, independently each occurrence, an alkyl radical of one to three carbon atoms or hydroxyethyl, and the sum of the carbon atoms in R and all R' is not greater than about 20.

2. The foamed slurry of claim 1 wherein, by volume, the solids therein comprise about 10 to about 35 percent of the foamed slurry, under conditions of use.

3. The foamed slurry of claim 1 wherein, by volume, the gas comprises about 20 to about 55 percent of the foamed slurry, under conditions of use.

4. The foamed slurry of claim 1, 2 or 3 wherein the hydraulic cement component comprises a Portland cement.

5. The foamed slurry of claim 1 wherein the solids and gas, by volume, comprise from about 10 and 20, respectively to about 35 and 55, respectively, percent of the foamed slurry, under conditions of use.

6. The foamed slurry of claim 1 or 5 wherein the foaming agent is present in an amount sufficient to permit the major portion of said gas to remain as discrete bubbles until said slurry has hardened.

7. The foamed slurry of claim 1 or 5 wherein the foaming agent is present, by volume, in an amount of about 0.1 part to about 3 parts per 100 parts water.

8. The foamed slurry of claim 7 wherein the foaming agent is present in an amount of about 0.5 to about 1.5 part per 100 parts water and the average diameter of said bubbles is about 0.5 millimeter or less.

9. The foamed slurry of claim 1 or 5 wherein the aqueous slurry further comprises, by weight, about 0.5 part to about 3 parts sodium silicate per 100 parts of the hydraulic cement component.

10. The foamed slurry of claim 9 wherein the hydraulic cement component comprises a Portland cement.

11. The foamed slurry of claim 9 which further comprises particles of finely divided fly ash having surface area of about 3000 cm$^2$/g or greater and the surface area of the hydraulic cement component is about 2000 cm$^2$/g or greater.

12. The foamed slurry of claim 6 wherein the foaming agent R is a hydrocarbyl radical of an average chain length of from 10 to 14 carbon atoms, R' is, independently each occurrence, methyl, ethyl, or in up to two occurrences hydroxyethyl, and X is chloride.

13. The foamed slurry of claim 9 wherein the foaming agent R is a hydrocarbyl radical of an average chain length of from 10 to 14 carbon atoms, R' is, independently each occurrence, methyl, ethyl, or in up to two occurrences hydroxyethyl, and X is chloride.

14. The foamed slurry of claim 12 wherein the hydraulic cement component comprises a Portland cement.

15. The foamed slurry of claim 6 wherein the foaming agent is selected from trimethylcocoammonium chloride, methyl bis(2-hydroxyethyl) cocoammonium chloride, trimethyldodecylammonium chloride or combinations thereof.

16. The foamed slurry of claim 15 wherein the foaming agent is present, by volume, in an amount of about 0.5 to about 1.5 part per 100 parts water and the hydraulic cement component comprises a Portland cement.

17. The foamed slurry of claim 15 wherein the foaming agent is present, by volume, in an amount of about 0.5 to about 1.5 part per 100 parts water, the hydraulic cement component comprises a Portland cement, the average diameter of said bubbles is about 0.5 millimeter or less and the foaming agent is selected from trimethylcocoammonium chloride and methyl bis(2-hydroxyethyl) cocoammonium chloride.

18. The foamed slurry of claim 17 which further comprises about 0.5 part to about 3 parts sodium silicate per 100 parts, by weight, of the Portland cement component.

19. The foamed slurry of claim 17 which further comprises bis(2-hydroxyethyl) cocoamine oxide.

20. The foamed slurry of claim 18 which further comprises bis(2-hydroxyethyl) cocoamine oxide in an amount of about 1 part, by volume, per 3 parts of the foaming agent, and the foaming agent is trimethylcocoammonium chloride.

21. The foamed slurry of claim 1 which further comprises finely divided silica.

22. The foamed slurry of claim 17 which further comprises finely divided silica.

23. A process for plugging a subterranean void with a lightweight, relatively impermeable plugging agent comprising emplacing a foamed slurry of claim 1 or 5 in the void and permitting same to harden.

24. A process for plugging a subterranean void with a lightweight, relatively impermeable plugging agent comprising a foamed slurry of claim 6 in the void and permitting same to harden.

25. A process for plugging a subterranean void with a lightweight, relatively impermeable plugging agent comprising emplacing a foamed slurry of claim 8 in the void and permitting same to harden.

26. A process for plugging a subterranean void with a lightweight, relatively impermeable plugging agent comprising emplacing a foamed slurry of claim 9 in the void and permitting same to harden.

27. A process for plugging a subterranean void with a lightweight, relatively impermeable plugging agent comprising emplacing a foamed slurry of claim 20 in the void and permitting same to harden.

28. A process for plugging a subterranean void with a lightweight, relatively impermeable plugging agent comprising emplacing a foamed slurry of claim 21 in the void and permitting same to harden.

29. The process of claim 24 wherein the foamed slurry is subjected to a temperature of about 150° F. or greater prior to hardening.

30. The foamed slurry of claim 6 wherein the foaming agent is present in an amount sufficient to permit the major portion of said gas to remain as discrete bubbles at a temperature of about 150° F. or greater until said slurry has hardened.

* * * * *